United States Patent [19]
Makaran

[11] Patent Number: 5,744,921
[45] Date of Patent: Apr. 28, 1998

[54] CONTROL CIRCUIT FOR FIVE-PHASE BRUSHLESS DC MOTOR

[75] Inventor: John E. Makaran, London, Canada

[73] Assignee: Siemens Electric Limited, Mississagua, Canada

[21] Appl. No.: 643,160

[22] Filed: May 2, 1996

[51] Int. Cl.$^6$ .................................................. H02K 23/00
[52] U.S. Cl. ..................... 318/254; 318/138; 318/439; 318/560; 318/431; 318/798; 318/799; 318/800; 318/801; 318/802; 318/803; 318/804; 318/805; 318/806; 318/807; 318/808; 318/809; 318/810; 318/811; 318/812; 318/813; 318/814; 318/815; 361/23
[58] Field of Search ...................... 318/254, 138, 318/439, 560, 798–815, 431; 361/23

[56] References Cited

U.S. PATENT DOCUMENTS

| | | | |
|---|---|---|---|
| 3,778,696 | 12/1973 | Walters et al. | 318/565 |
| 3,931,557 | 1/1976 | Osburn | 318/434 |
| 3,937,974 | 2/1976 | Lafuze . | |
| 4,100,530 | 7/1978 | Brinker et al. | 340/53 |
| 4,151,450 | 4/1979 | Fukuma et al. | 318/317 |
| 4,162,435 | 7/1979 | Wright . | |
| 4,182,960 | 1/1980 | Reuyl | 290/1 R |
| 4,197,532 | 4/1980 | Lawson, II | 340/648 |
| 4,278,922 | 7/1981 | Grebe | 318/264 |
| 4,289,195 | 9/1981 | Bellot et al. | 165/12 |
| 4,291,717 | 9/1981 | Orcutt | 137/86 |
| 4,323,111 | 4/1982 | Iijima | 165/25 |
| 4,328,522 | 5/1982 | Tryan | 361/33 |
| 4,347,468 | 8/1982 | Wilke | 318/331 |
| 4,352,452 | 10/1982 | Shimada et al. | 236/13 |
| 4,359,875 | 11/1982 | Ohtani | 62/133 |
| 4,364,513 | 12/1982 | Tsuzuki et al. | 236/49 |
| 4,393,834 | 7/1983 | Doherty, Jr. | 123/339 |
| 4,402,217 | 9/1983 | Higashiyama | 73/117.3 |
| 4,403,177 | 9/1983 | Weber et al. . | |

(List continued on next page.)

FOREIGN PATENT DOCUMENTS

| | | |
|---|---|---|
| 0 433 219 A | 6/1991 | European Pat. Off. . |
| 4310260 C1 | 9/1994 | Germany . |
| 29516307U1 | 3/1996 | Germany . |
| 60002091 | 8/1985 | Japan . |
| 63-302792 | 9/1988 | Japan . |
| WO 88 01763 A | 3/1988 | WIPO . |

OTHER PUBLICATIONS

Switchgear and Control Handbook, Smeaton, Robert W., Second Edition, McGraw-Hill Book Company, pp. 29-1 through 29-14.

*Primary Examiner*—Karen Masih

[57] ABSTRACT

A control system (100) for a five-phase brushless DC motor (102) including a stator having five windings and a rotor (116) mounted for rotation relative to the windings (114). The windings (114) are adapted to be electronically commutated in response to the rotary position of the rotor (116). The control system (100) includes a sensing circuit (106) to sense the rotary position of the rotor (116) using an optical or magnetic sensor or the back electromotive force voltages in the windings (114). Electronic switches (112) control the flow of current through the windings (114) in response to control signals generated by a control circuit (110) in response to the rotary position of the rotor (116). The control circuit (110) includes start-up logic to start the motor (102). If the rotor (116) is rotating in a wrong direction upon start-up, the control circuit (110) energizes preselected windings (114) and waits for the movement of the rotor (116) to come substantially to a stop and then energizes the windings (114) in a start-up sequence to cause the rotor (116) to rotate in a correct direction. Once the rotor (116) is rotating in the correct direction, the control circuit (110) electronically commutates the windings (114) in response to the rotary position of the rotor (116).

20 Claims, 14 Drawing Sheets

Microfiche Appendix Included
(1 Microfiche, 35 Pages)

U.S. PATENT DOCUMENTS

| | | | |
|---|---|---|---|
| 4,423,307 | 12/1983 | Kondo et al. | 219/202 |
| 4,426,852 | 1/1984 | Nishimura et al. | 62/179 |
| 4,435,732 | 3/1984 | Hyatt | 358/254 |
| 4,456,055 | 6/1984 | Yoshimi et al. | 165/12 |
| 4,460,035 | 7/1984 | Mizote et al. | 165/12 |
| 4,480,443 | 11/1984 | Nishi et al. | 62/227 |
| 4,490,661 | 12/1984 | Brown et al. . | |
| 4,494,058 | 1/1985 | Berti . | |
| 4,498,309 | 2/1985 | Kobayashi et al. | 62/186 |
| 4,528,486 | 7/1985 | Flaig et al. | 318/254 |
| 4,537,042 | 8/1985 | Nishi et al. | 62/208 |
| 4,539,823 | 9/1985 | Nishi et al. | 62/228.5 |
| 4,546,412 | 10/1985 | Nakazawa et al. | 361/395 |
| 4,557,223 | 12/1985 | Gueyen | 123/41.12 |
| 4,588,934 | 5/1986 | Suzuki et al. | 318/449 |
| 4,609,868 | 9/1986 | Ferrari | 324/158 |
| 4,616,693 | 10/1986 | Dietzsch et al. | 165/41 |
| 4,651,069 | 3/1987 | Pellegrini . | |
| 4,667,480 | 5/1987 | Bessler | 62/180 |
| 4,678,973 | 7/1987 | Elliott et al. | 318/254 |
| 4,694,210 | 9/1987 | Elliott et al. . | |
| 4,694,371 | 9/1987 | Reinhardt et al. | 361/23 |
| 4,697,737 | 10/1987 | Ueda | 236/13 |
| 4,705,997 | 11/1987 | Juzswik | 318/341 |
| 4,720,638 | 1/1988 | Vollbrecht | 290/38 R |
| 4,739,240 | 4/1988 | MacMinn et al. | 318/811 X |
| 4,748,432 | 5/1988 | Yamada | 337/366 |
| 4,759,269 | 7/1988 | Brown et al. | 98/2.01 |
| 4,774,910 | 10/1988 | Aihara et al. | 123/41.2 |
| 4,780,653 | 10/1988 | Bezos et al. | 318/327 |
| 4,809,517 | 3/1989 | Miyanaga | 62/163 |
| 4,823,744 | 4/1989 | Omura | 123/41.12 |
| 4,834,283 | 5/1989 | Akabane et al. | 236/13 |
| 4,840,308 | 6/1989 | Akabane et al. | 236/13 |
| 4,847,721 | 7/1989 | Nothofer et al. | 361/23 |
| 4,876,492 | 10/1989 | Lester et al. | 318/254 |
| 4,878,001 | 10/1989 | Hagikura et al. | 318/446 |
| 4,881,494 | 11/1989 | Ishigami | 123/41.12 |
| 4,883,982 | 11/1989 | Forbes et al. . | |
| 4,893,590 | 1/1990 | Kashmirua | 123/41.31 |
| 4,920,755 | 5/1990 | Tadahiro | 62/171 |
| 4,922,171 | 5/1990 | Ohi | 318/471 |
| 4,928,043 | 5/1990 | Plunkett . | |
| 4,930,567 | 6/1990 | Akabane et al. | 165/25 |
| 4,968,869 | 11/1990 | Copeland | 219/202 |
| 4,976,461 | 12/1990 | Takahashi | 236/13 |
| 4,992,169 | 2/1991 | Izumiya . | |
| 4,992,710 | 2/1991 | Cassat . | |
| 5,001,405 | 3/1991 | Cassat . | |
| 5,017,845 | 5/1991 | Carobolante et al. . | |
| 5,017,846 | 5/1991 | Young et al. | 318/244 |
| 5,019,756 | 5/1991 | Schwarz . | |
| 5,023,527 | 6/1991 | Erdman et al. . | |
| 5,023,528 | 6/1991 | Saidin et al. . | |
| 5,028,852 | 7/1991 | Dunfield . | |
| 5,043,642 | 8/1991 | Ohi . | |
| 5,053,686 | 10/1991 | Juarez . | |
| 5,062,352 | 11/1991 | Ostrand | 98/2.08 |
| 5,075,608 | 12/1991 | Erdman et al. . | |
| 5,079,488 | 1/1992 | Harms et al. | 318/471 |
| 5,117,165 | 5/1992 | Cassat et al. . | |
| 5,125,067 | 6/1992 | Erdman . | |
| 5,127,238 | 7/1992 | Ichikawa et al. | 62/244 |
| 5,186,387 | 2/1993 | Doi et al. | 236/49.3 |
| 5,187,417 | 2/1993 | Minnich et al. . | |
| 5,196,771 | 3/1993 | Naito . | |
| 5,206,567 | 4/1993 | Sakurai et al. | 312/254 |
| 5,208,518 | 5/1993 | Grapenthin et al. . | |
| 5,210,474 | 5/1993 | Oswald . | |
| 5,227,704 | 7/1993 | Erdman . | |
| 5,233,275 | 8/1993 | Danino . | |
| 5,234,050 | 8/1993 | Weigert | 165/26 |
| 5,241,247 | 8/1993 | Salerno et al. . | |
| 5,245,256 | 9/1993 | Cassat et al. . | |
| 5,247,808 | 9/1993 | Yoshida et al. | 62/228.4 |
| 5,254,914 | 10/1993 | Dunfield et al. . | |
| 5,254,918 | 10/1993 | Ueki . | |
| 5,287,005 | 2/1994 | Shinkawa | 307/10.1 |
| 5,298,838 | 3/1994 | Peters et al. . | |
| 5,304,912 | 4/1994 | Kajiwara et al. | 318/802 |
| 5,325,026 | 6/1994 | Lyons et al. . | |
| 5,327,053 | 7/1994 | Mann et al. . | |
| 5,334,917 | 8/1994 | Lind . | |
| 5,336,956 | 8/1994 | Haner . | |
| 5,343,127 | 8/1994 | Maiocchi . | |
| 5,349,257 | 9/1994 | Hernden . | |
| 5,350,987 | 9/1994 | Ueki . | |
| 5,367,234 | 11/1994 | DiTucci . | |
| 5,369,349 | 11/1994 | Tsuchiya et al. | 318/811 |
| 5,376,866 | 12/1994 | Erdman | 318/254 |
| 5,378,967 | 1/1995 | Naito . | |
| 5,382,889 | 1/1995 | Peters et al. . | |
| 5,382,890 | 1/1995 | Moh et al. . | |
| 5,384,527 | 1/1995 | Rozman et al. . | |
| 5,389,862 | 2/1995 | Tominaga . | |
| 5,397,972 | 3/1995 | Maiocchi . | |
| 5,414,331 | 5/1995 | Izawa et al. | 318/254 |
| 5,436,547 | 7/1995 | Nagai et al. | 318/801 |
| 5,473,232 | 12/1995 | Tamaki et al. | 318/439 |
| 5,543,696 | 8/1996 | Huggett et al. | 318/803 X |

CONTROL CIRCUIT FOR FIVE-PHASE BRUSHLESS DC MOTOR

RELATED DOCUMENTATION

This application includes a microfiche appendix including 1 microfiche and 35 frames.

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The invention generally relates to a control system for a brushless direct-current (DC) motor. The invention particularly relates to a control system for a five-phase brushless DC motor including a stator having five windings adapted to be electronically commutated in response to the rotary position of a rotor mounted for rotation relative to the windings.

BACKGROUND OF THE INVENTION

Brushless DC motors, also known as self-synchronous or electronically-commutated motors, are used in a variety of applications including land vehicle and aerospace applications. For example, brushless DC motors are used in automotive engine cooling applications and in heating, ventilation and air-conditioning (HVAC) equipment.

A brushless DC motor may include a stator wound with windings, or coils, and a rotor with rotor-mounted permanent magnets. An electronic control system or circuit switches or commutates current in the proper stator windings at the correct time in a process known as commutation. The control system responds in real time to the sensed rotary position of the rotor to generate a coordinated sequence of control signals, which are provided to electronic switches such as transistors that control the flow of current through the windings. The current flow through each winding radiates a torque-inducing magnetic flux that causes the rotor to rotate. The sequential switching of current between the windings produces a magnetic flux oriented in a synchronized fashion that results in a torque on the rotor and causes rotational movement. The sequence of control signals generated in response to the sensed rotary position of the rotor maintains a desired relationship between the magnet positions on the rotor and the windings on the stator.

In a multi-phase brushless DC motor, each energized winding generates a sinusoidal relationship between phase angle and torque which is out of phase with the other windings. For example, in certain three-phase brushless DC motors, a control circuit energizes three windings with a voltage displaced by a phase angle of 120 electrical degrees. Although three-phase motors are used due to their capacity to provide a balanced power output, three-phase motors may be noisy and may not be suitable for high-temperature environments since all of the current flowing through the windings may flow through a single switch such as a transistor, thereby causing a high power dissipation per device.

Various techniques can be used to detect the rotary position of the rotor. Known systems may use sensors coupled to a motor shaft to detect the rotary angle of the motor shaft. These sensors may include Hall sensors, optical sensors and resolvers. However, the use of discrete feedback sensors in the motor may adversely affect the size, cost, complexity, power consumption and, particularly with Hall sensors, reliability of the motor.

In response to the problems associated with discrete sensors, some control circuits sense the back electromotive force (EMF) voltages generated in the windings as the motor rotates. Back EMF magnitude and frequency information can be used to determine the rotary position of the rotor. However, the back EMF voltage signals generally cannot be used for control during start-up or initial acceleration of the motor since the EMF signal is absent or undetectable when the rotor is stationary or rotating at low speed.

A circuit for starting a sensorless brushless DC motor is shown in U.S. Pat. No. 4,678,973. The circuit starts the motor by obtaining the direction of rotation upon start-up. If the rotor is rotating in a correct direction, the circuit energizes the windings to continue rotation. If the rotor is rotating in a wrong direction, the energization sequence is reversed to bring the rotor to a halt before starting is again attempted. However, it is believed that the circuit as shown can not control start-up of a five-phase brushless DC motor.

Accordingly, it would be desirable to provide a control circuit for a five-phase brushless DC motor. It would also be desirable to provide a control system for starting a five-phase brushless DC motor by determining the direction of rotation of a rotor upon start-up and, if the rotor is rotating in a wrong direction, energizing at least two windings until the movement of the rotor comes substantially to a stop and then energizing the plurality of windings in a start-up sequence to cause the rotor to rotate in a correct direction. It would also be desirable to provide a multi-phase brushless DC motor wherein more than one winding is energized in parallel.

SUMMARY OF THE INVENTION

The invention relates to a control system for electronically commutating a five-phase brushless DC motor adapted to be energized from a source of voltage. The motor includes a stator having five windings adapted to be electronically commutated and a rotor mounted for rotation relative to the windings. The control system includes a sensing circuit configured to generate signals corresponding to the rotary position of the rotor, an electronic commutation circuit including switches coupled to the windings, and a control circuit coupled to the sensing circuit and the commutation circuit. The control circuit is configured to generate control signals in response to the rotary position of the rotor and to apply the control signals to the commutation circuit, wherein the commutation circuit controls the flow of current through the windings in response to the control signals.

The invention also relates to a drive circuit for a five-phase brushless DC motor having five windings and a rotor mounted for rotation relative to the windings. The windings are adapted to be energized by the timed application of drive voltages producing the flow of phase currents in the respective windings. The drive circuit includes a plurality of position sensors configured to generate a pattern of signals related to the rotary position of the rotor, electrically controllable switches coupled to the windings, and a motor controller coupled to the position sensors and the controllable switches. The motor controller is configured to generate commutation control signals based upon the pattern of signals received from the position sensors and to apply the control signals to the controllable switches, wherein the controllable switches control the flow of current through the windings in response to the control signals.

Further, the invention relates to a control system for a brushless DC motor adapted to be energized from a source of voltage. The motor includes a stator having a plurality of windings adapted to be electronically commutated and a rotor mounted for rotation relative to the windings. The control system includes a sensing circuit configured to generate signals corresponding to the rotary position of the rotor, an electronic commutation circuit including switches coupled to the windings, and a control circuit coupled to the sensing circuit and the commutation circuit. The control circuit is configured to determine the direction of rotation of the rotor upon start-up and, if the rotor is rotating in a wrong direction, to energize at least two windings and wait for the movement of the rotor to come substantially to a stop. The control circuit is configured to then energize the plurality of windings in a start-up sequence to cause the rotor to rotate in a correct direction and, when the rotor is rotating in the correct direction, to electronically commutate the windings in response to the rotary position of the rotor.

The invention also relates to a control system for electronically commutating a brushless DC motor adapted to be energized from a source of voltage. The motor includes a stator having a plurality of windings adapted to be commutated and a rotor mounted for rotation relative to the windings. The control system includes a sensing circuit configured to generate signals corresponding to the rotary position of the rotor, an electronic commutation circuit including switches coupled to the windings, and a control circuit coupled to the sensing circuit and the commutation circuit. The control circuit is configured to generate pulse-width modulated control signals in response to the rotary position of the rotor and to apply the control signals to the commutation circuit, wherein the commutation circuit responds to the control signals by energizing at least two windings at generally the same time.

BRIEF DESCRIPTION OF THE DRAWINGS

The invention will become more fully understood from the following detailed description of the preferred embodiment thereof, taken in conjunction with the accompanying drawings, wherein like reference numerals refer to like parts, in which.

DETAILED DESCRIPTION OF THE PREFERRED EMBODIMENT

Figure 1:
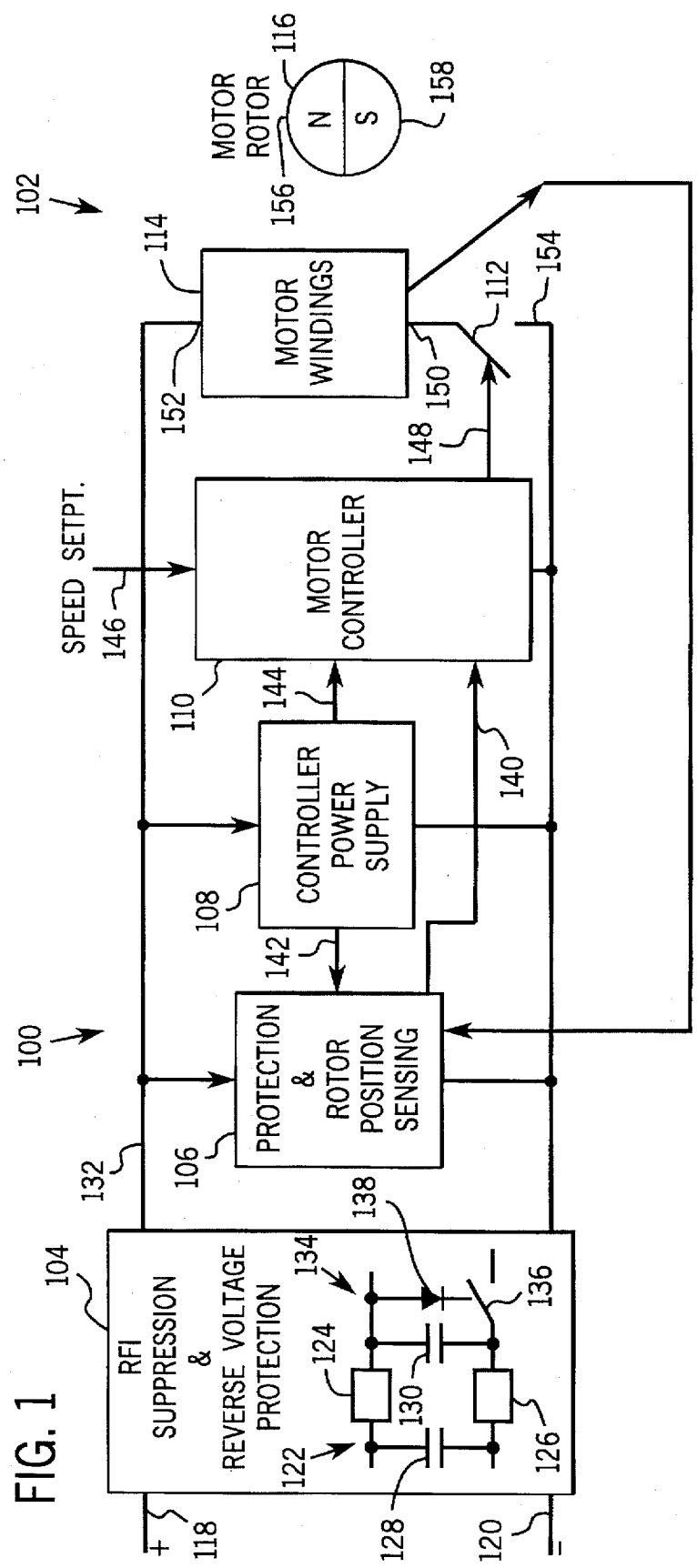
FIG. 1 is a block diagram of a five-phase unipolar DC brushless motor and a control system for electronically commutating the motor.

Referring to FIG. 1, a control system 100 is shown for electronically commutating a brushless DC motor 102. Control system 100 includes a motor power supply 104, a protection and rotor position sensing circuit 106, a controller power supply 108, a motor controller 110 and a power stage 112. Motor 102 includes motor windings 114 and a motor rotor 116. Control system 100 and motor 102 can be packaged together or separately. Also, the components of control system 100 except for power stage 112 could be packaged separately from power stage 112, with motor 102 and power stage 112 packaged together.

Motor power supply 104 receives a DC voltage from a power source (not shown) via power leads 118 and 120. Typically, the power source is a battery supplying a 12 V signal. Alternatively, the power source could be a DC voltage output from a power conditioning circuit which rectifies and filters an AC voltage source. A line filter 122 coupled to the power source limits conducted RFI emissions. Line filter 122 may include a passive LC filter network including inductors 124 and 126 connected in series with, and capacitors 128 and 130 connected in parallel across, power leads 118 and 120. The use of balun or bead chokes for the inductors may simplify packaging due to a higher inductance/volume ratio than other known rod wound chokes. Motor power supply 104 may include components to limit power supply current ripple including small value and electrolytic capacitors. A conditioned DC voltage output 132 from motor power supply 104 supplies power to other control system 100 components and to motor 102. In one embodiment, motor 102 has a power range of 100 to 500 W.

Other provisions may be made to suppress RFI in addition to line filter 122. For example, radiated RFI may be suppressed by shielding control system 100 and/or motor windings 114 in whole or in part using a shielding material. Also, input/output leads from control system 100 can be passed through noise suppressing grommets. As another example, film capacitors placed across the power terminals of the MOSFET driver chips used in power stage 112 to amplify the control signals, as described below, may reduce conducted EMI emissions.

Motor power supply 104 includes a reverse voltage protection circuit 134 to prevent current flow through control system 100 during a reverse voltage condition (i.e., when the voltages at power leads 118 and 120 are reversed). Reverse voltage protection circuit 134 includes a switch 136 and a diode 138. Switch 136 is a MOSFET transistor which does not conduct current unless the gate voltage is positive. During a reverse voltage condition, the voltage at the MOSFET gate is negative and the MOSFET does not turn on, thereby preventing the flow of current through control system 100 and protecting its components. Switch 136 may include multiple MOSFETs in parallel. Alternatively, switch 136 may be a Schottky diode instead of a MOSFET. However, motor efficiency may be adversely affected since a Schottky diode has a larger forward voltage drop than a MOSFET.

Figure 12A:
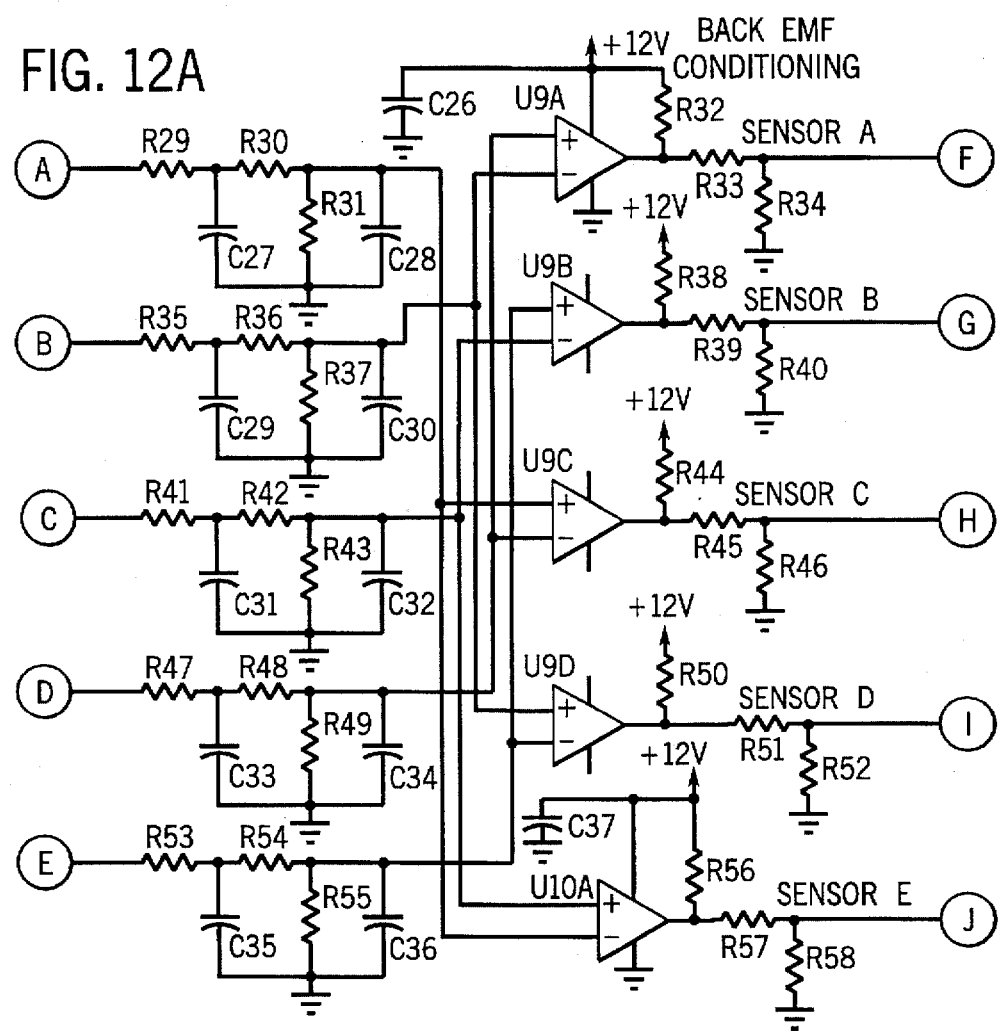
FIGS. 12A through 12E are a circuit schematic showing an exemplary implementation of the control system of FIG. 1.
Figure 12B:
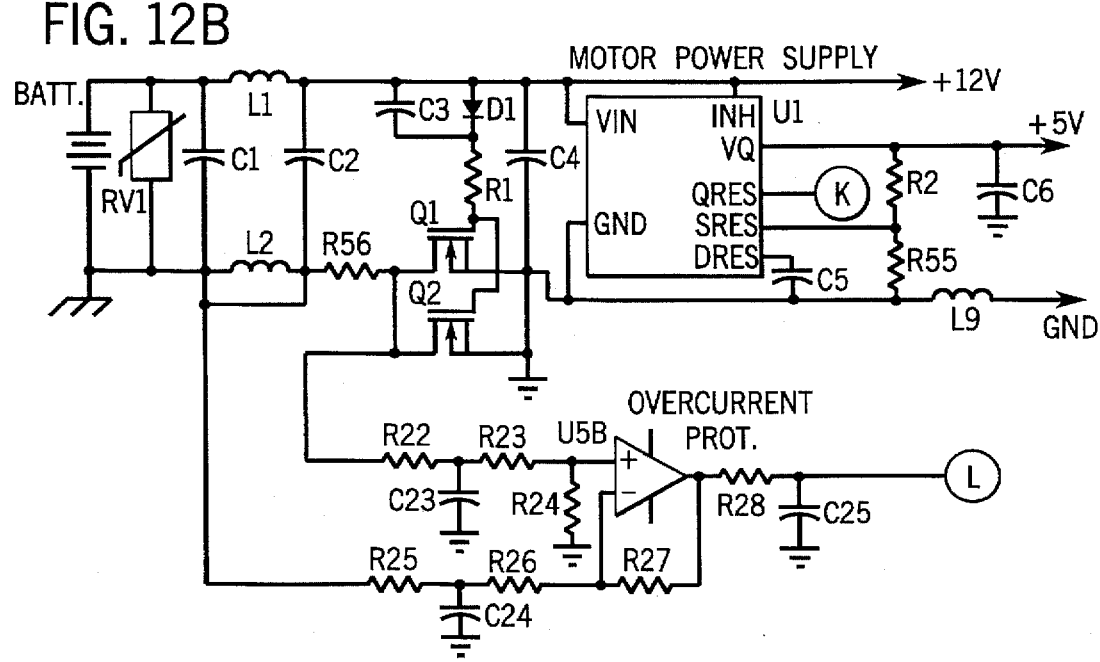
Figure 12C:
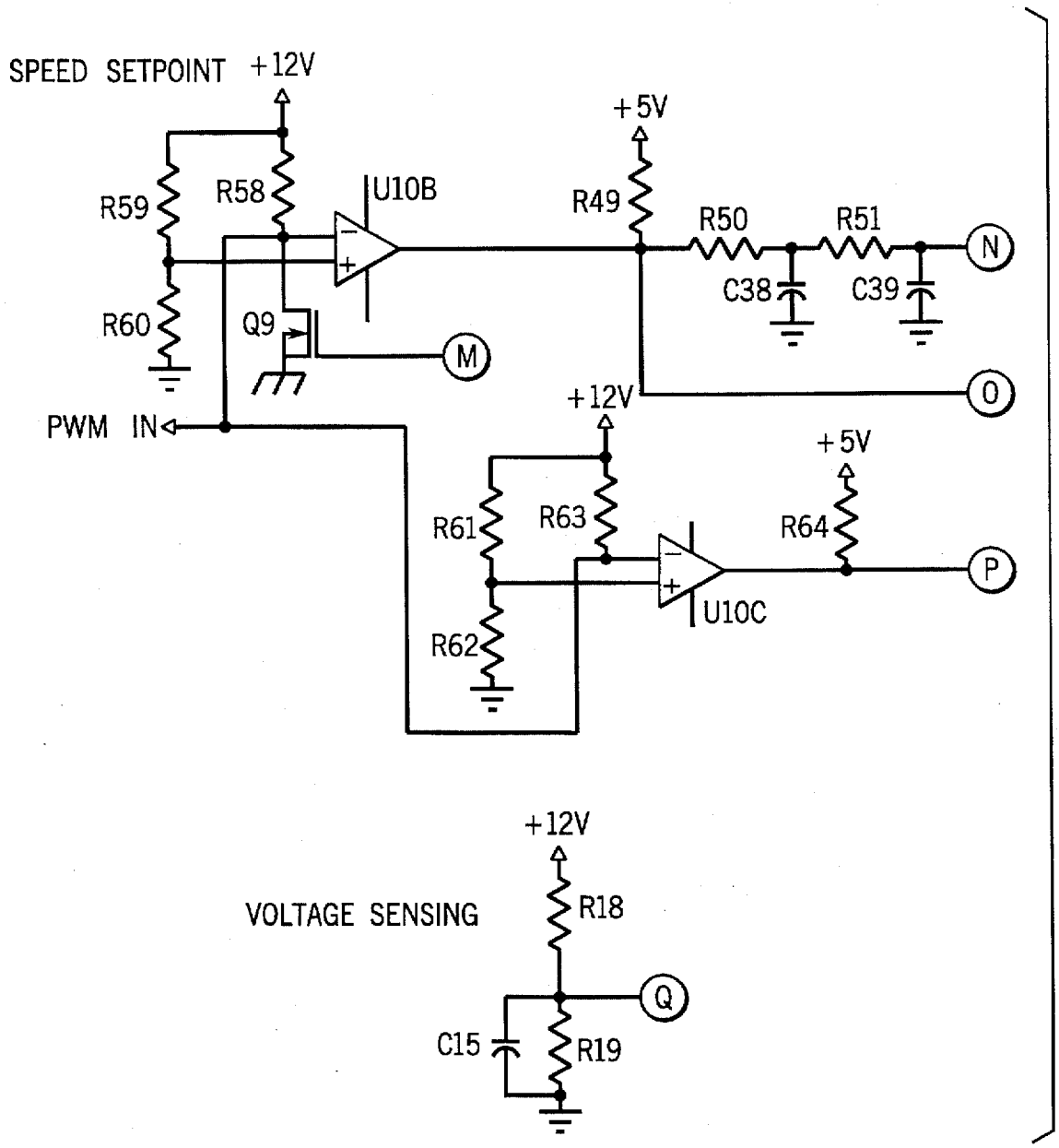
Figure 12D:
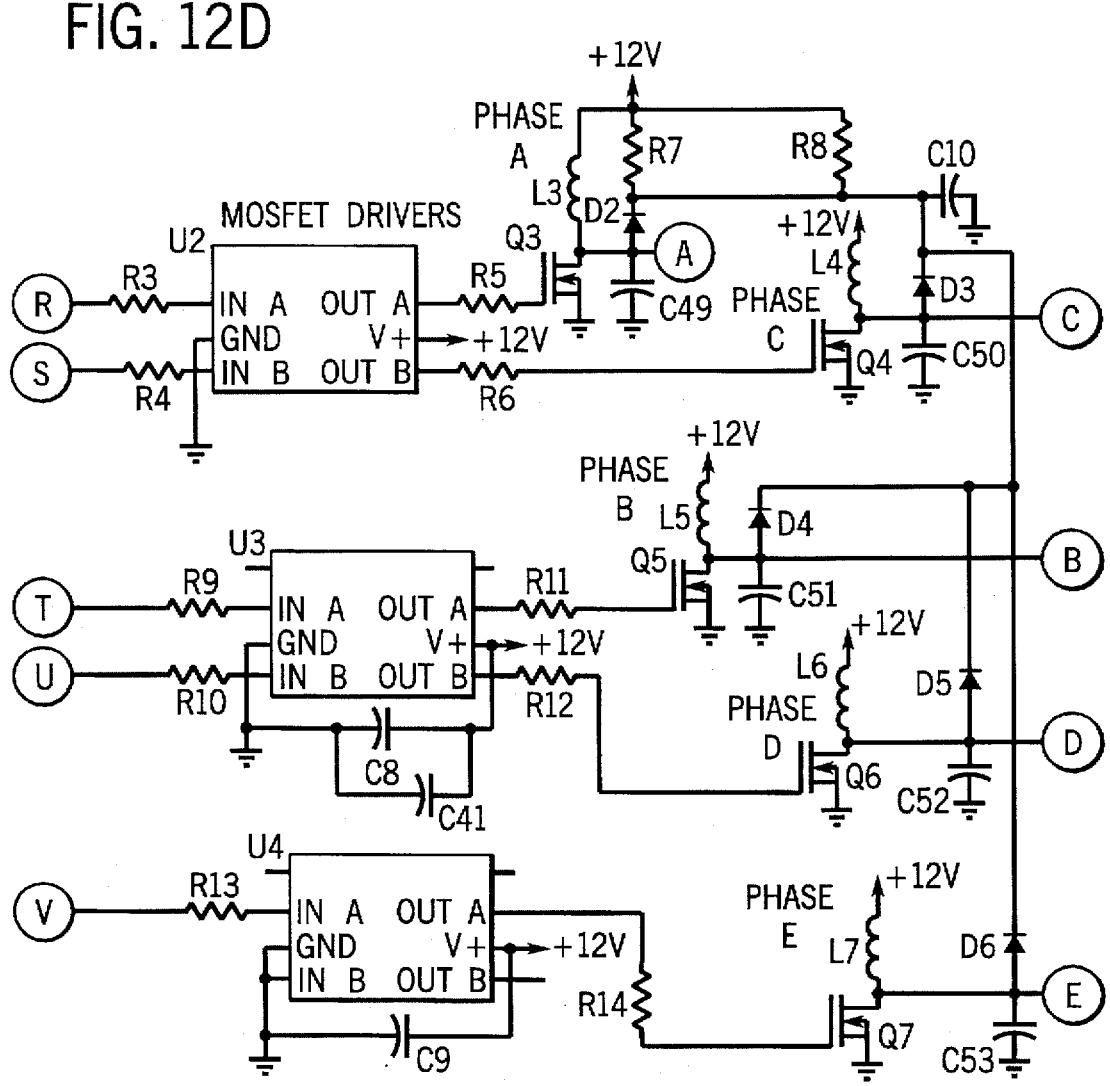
Figure 12E:
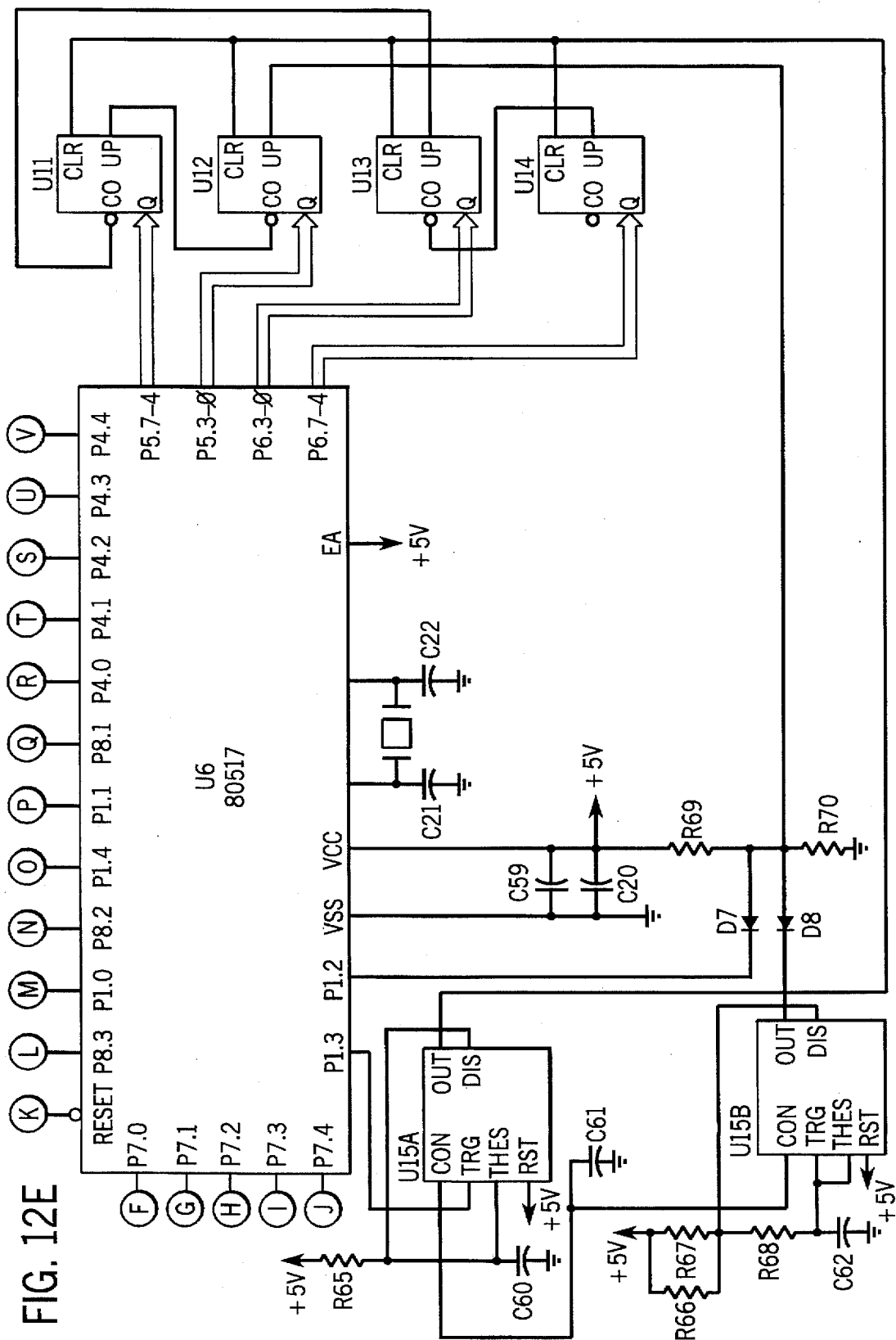

Motor power supply 104 may include components to provide load dump protection. For example, a varistor (shown as RV1 in FIG. 12B) protects control system 100 from transient voltage spikes. The varistor may be, for example, a CU2220K30AUTOG automotive varistor. The varistor rating selection determines the cutoff level of the voltage transient spike.

Sensing circuit 106 includes circuitry for sensing parameters and generating signals used by motor controller 110 to protect control system 100 and motor 102 as described below. The signals are applied to motor controller 110 over lines 140. An over/under voltage circuit generates a signal based upon conditioned voltage output 132. An overcurrent circuit generates a signal based upon the current flowing through control system 100. In addition, an overtemperature circuit may be used to generate a signal based upon a sensed temperature. In each case, the sensed signal is preferably an analog voltage scaled to a voltage within the range of an A/D converter within motor controller 110. As described below, using an analog signal allows fault detection limits to be set in software. However, each signal may also be a logic signal (e.g., 0 or 5 V) indicating whether or not a fault condition has occurred. Motor controller 110 may poll for fault conditions, or may be interrupted when a fault condition occurs.

In one embodiment, the over/under voltage circuit generates an analog 0 to 5 V signal from the conditioned voltage output 132 using a voltage divider. The overcurrent circuit generates an analog 0 to 5 V signal by sensing the voltage drop across a sense resistor shown in FIG. 12B as R56. Alternatively, the overcurrent circuit could sense the voltage drop across RFI choke 126 which is generally proportional to current, and the temperature of choke 126 could be sensed and used to compensate the sensed voltage in hardware or software. As another alternative, the overcurrent circuit could sense the voltage drop across the MOSFET 136 or across a switch in power stage 112. If an overtemperature circuit is used, the circuit will preferably generate an analog 0 to 5 V signal using a zener diode, semiconductor temperature sensor, RTD or MOSFET 136. If MOSFET 136 is used, the $RDS_{on}$ of MOSFET 136 can be indirectly measured by measuring a voltage drop across it. In each case, motor controller 110 converts the sensed analog signal to a digital value and compares the digital value to a threshold limit or a range to determine whether a fault occurred. If a fault occurs, motor controller 110 invokes a fault handling sequence as described below.

Sensing circuit 106 also includes circuitry for sensing the rotary position of motor rotor 116 and generating signals corresponding to the rotary position. Motor controller 110 uses the rotary position signals to control the start-up, commutation and speed of motor 102, and to protect against stall or reduced speed conditions. The signals are also applied to motor controller 110 over lines 140. In one embodiment, motor 102 has an operating speed range of 200 to 5000 rpm.

To sense the rotary position of motor rotor 116, sensing circuit 106 may sense signals from optical or magnetic sensors coupled to a shaft of motor 102 to sense the rotary angle of the shaft. Optical sensors may use a toothed wheel mechanically linked to the motor shaft, with the teeth synchronized with the back EMF in the motor windings 114 in a manner such that the breaking of an optical switch represents a positive or negative back EMF polarity, and the making of an optical switch represents a negative or positive back EMF polarity. Magnetic sensors may be used in the same manner as optical switches with a separate magnetic wheel, or by obtaining position information from the rotor magnets themselves. Sensing circuit 106 may also use signals from resolvers or Hall sensors.

Sensing circuit 106 may also sense the back EMF voltages generated in motor windings 114 as motor 102 rotates. The back EMF signals can be compared to each other or to a voltage reference which may be fixed in magnitude, or may be variable depending on motor speed or load. Motor controller 110 determines the position of motor rotor 116 based upon the back EMF signals. In one embodiment, the back EMF from five pairs of windings are compared to generate five discrete position signals.

Controller power supply 108 includes a voltage regulator which receives conditioned voltage output 132 from motor power supply 104 and provides a lower voltage source for sensing circuit 106 and motor controller 110. The regulated voltage is typically 5 V, and is applied to sensing circuit 106 and to motor controller 110 via lines 142 and 144, respectively.

As described above, motor controller 110 receives signals based upon sensed parameters and the rotary position of motor rotor 116 from sensing circuit 106, and receives regulated power from controller power supply 108. Motor controller 110 also receives a speed setpoint signal 146. Speed setpoint signal 146 is used by motor controller 110 to set a desired, or reference, speed of motor 102. Speed setpoint signal 146 may be an analog voltage or current, or may be a digital signal from a serial or parallel communication interface. For example, speed setpoint signal 146 may be transmitted to motor controller 110 by a vehicle engine control unit (ECU), and may be part of a stream of communications data which controls the speed and duration of motor 102. In an HVAC application, speed setpoint signal 146 may be generated by an operator-controlled electronic circuit such as an analog potentiometer or a digital potentiometer with a keypad input device (not shown).

Motor controller 110 generates control signals for motor windings 114 which are applied to power stage 112 via line 148. Power stage 112 amplifies the logic-level control signals and uses the amplified signals to turn on electronic switches coupled to motor windings 114. In one embodiment, the electronic switches are MOSFET power transistors connected in series with motor windings 114, with one switch coupled to the bottom 150 of each motor phase. The top 152 of each motor phase is connected to conditioned voltage output 132. When a switch is turned on by the control signal from motor controller 110, current flows from voltage output 132 through the respective motor winding 114, through the respective switch and then returns via a common return path 154.

Motor controller 110 provides a pulse-width modulated (PWM) control signal above the audible range (e.g., between 20 and 40 KHz). The duty cycle of the PWM signal may be varied between 0 and 100%, representing a speed of motor 102 between 0 and a maximum speed. The PWM signal is multiplexed to control different switches based upon the rotary position of motor rotor 116. Motor controller 110 is also capable of converting speed setpoint signal 146 to a block of variable duration which may be used to commutate motor windings 114 (i.e., block commutation). Thus, motor controller 110 controls the start-up, commutation and speed of motor 102 by varying the duty cycle and multiplexing of the control signals to power stage 112. Alternatively, motor controller 110 may use linear control to drive current through windings 114. However, the use of PWM control signals minimizes or at least reduces power dissipation in the windings and is more suitable for high-temperature applications. Motor controller 110 also provides protection for motor windings 114 and the switches within power stage 112 by modifying the control signals based upon sensed parameters and rotor position as described below.

Motor 102 includes motor windings 114 and motor rotor 116. A five-phase brushless DC motor includes a stator wound with five windings 114. Motor rotor 116 is mounted in a manner allowing for rotation relative to windings 114. Motor 102 shown in FIG. 1 is a unipolar motor which includes permanent magnets creating one north pole 156 and one south pole 158. However, motor 102 could also include more than one pole.

Figure 2:
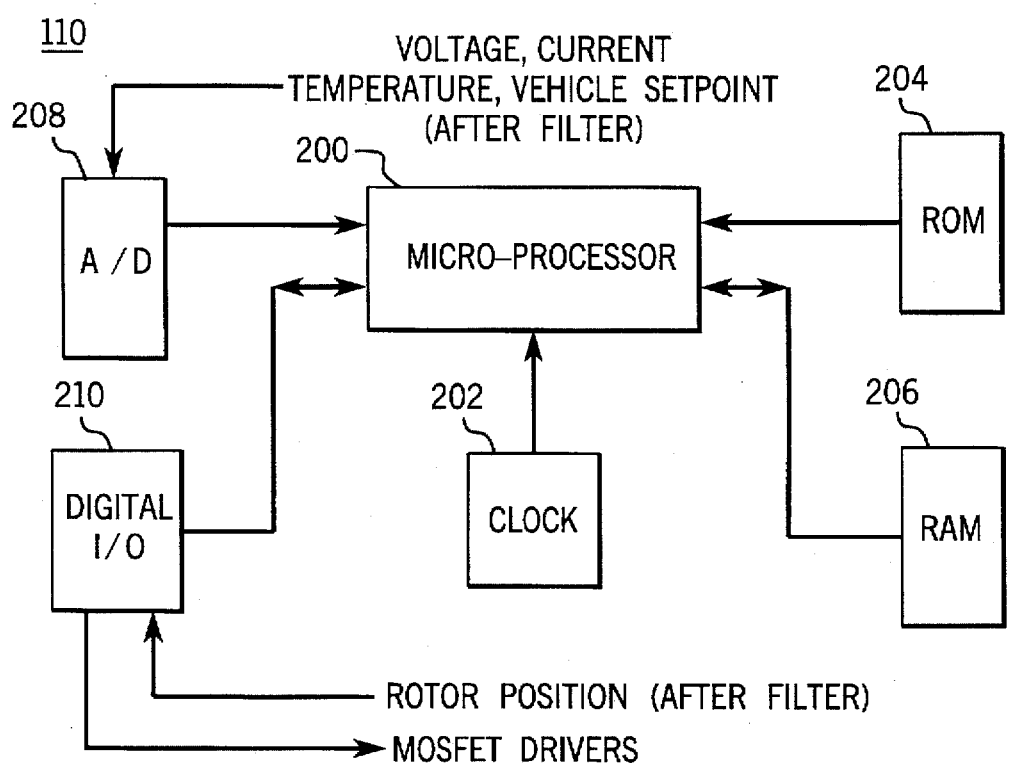
FIG. 2 is a block diagram showing the motor controller of FIG. 1.
Figure 3:
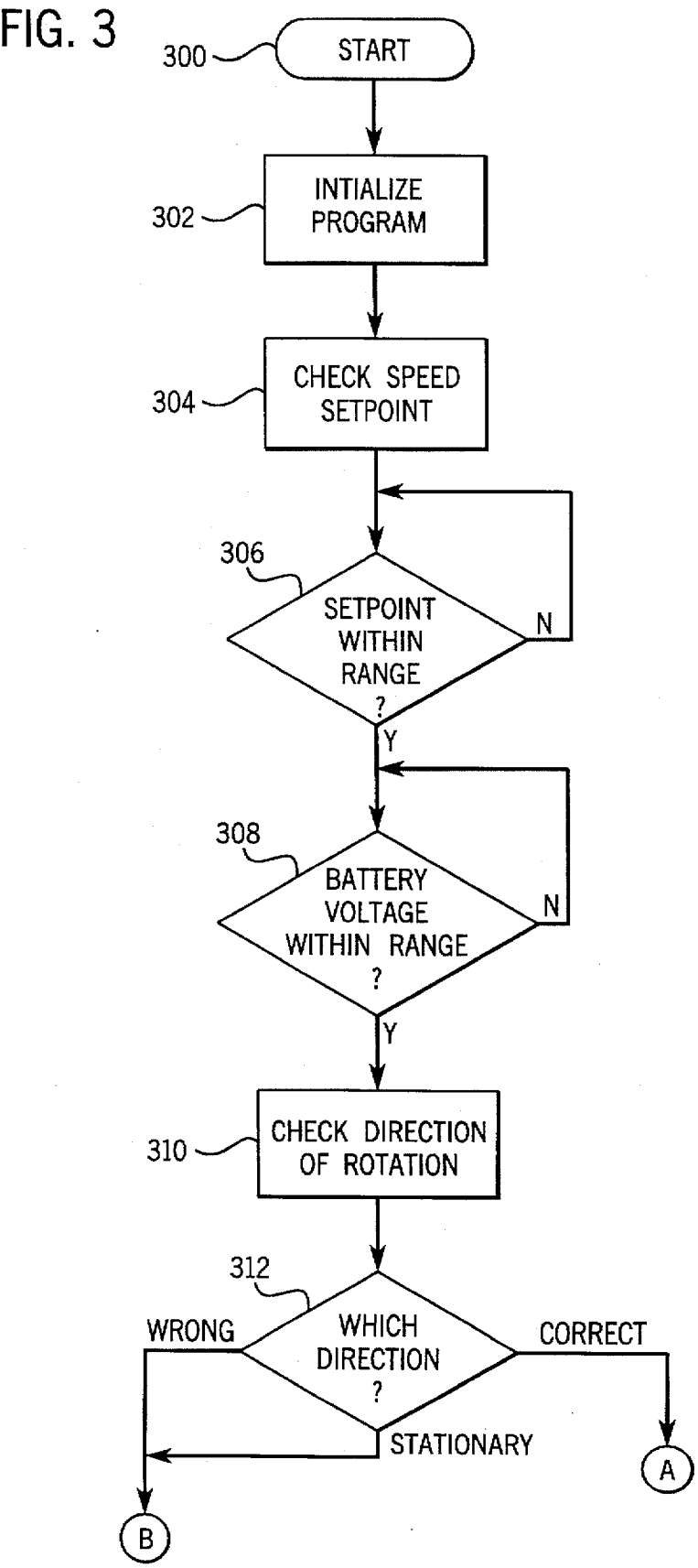
FIGS. 3 through 7 are exemplary flow chart diagrams showing the main procedure performed by the motor controller of FIG. 1.
Figure 4:
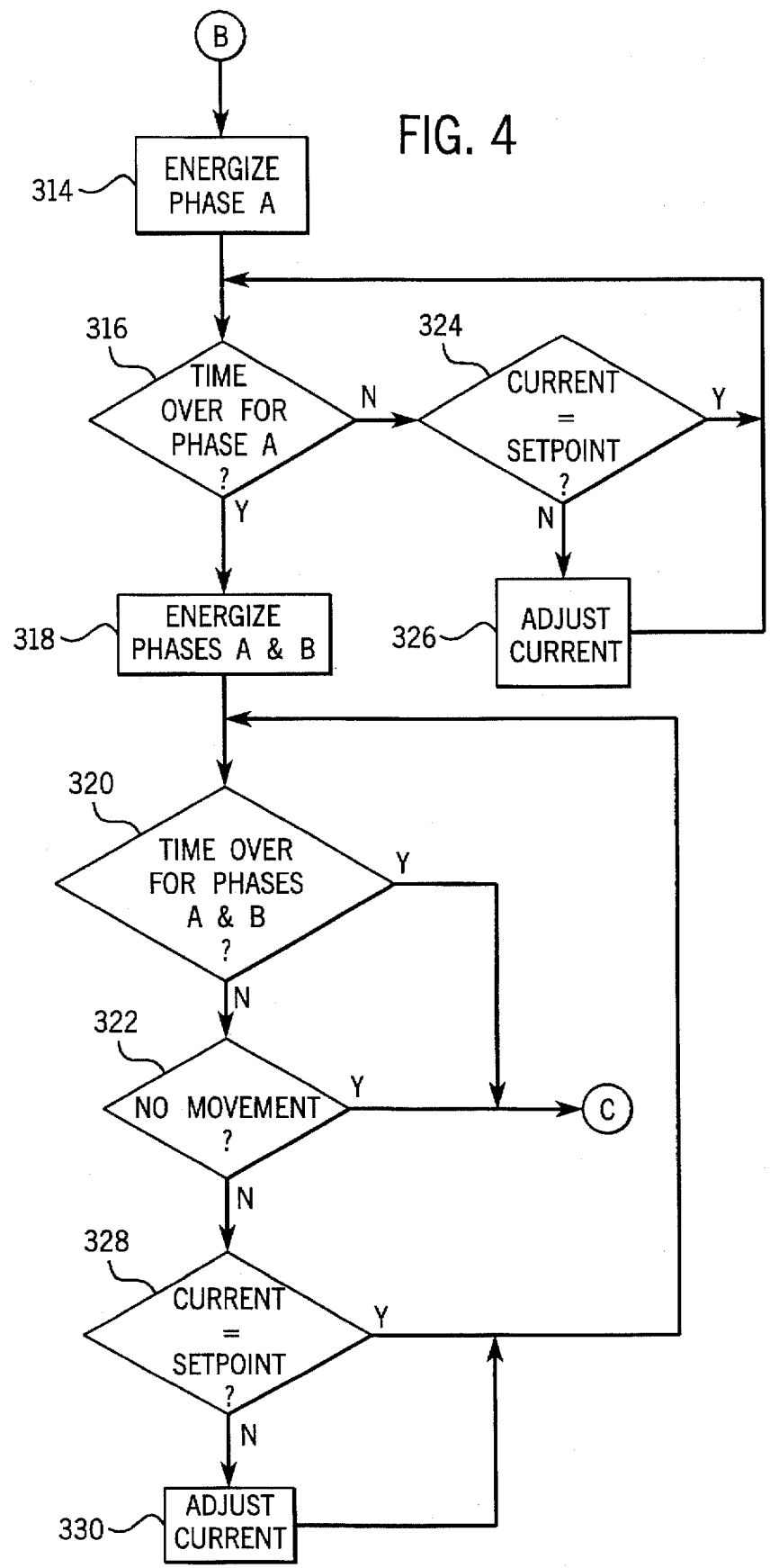

Referring to FIG. 2, motor controller 110 may be an analog, digital or combination analog and digital circuit. In one embodiment, motor controller 110 includes a microprocessor or microcontroller 200 coupled to a clock 202, a non-volatile memory 204 such as a read-only memory (ROM) for storing program instructions executed by microprocessor 200, a volatile memory 206 such as a random-access memory (RAM), an analog-to-digital (A/D) converter 208 and a digital input/output interface 210. Microprocessor 200 may be an 80517 microcontroller with built-in memory. Alternatively, non-volatile memory 204 may be an EPROM, EEPROM or FLASH memory external to microprocessor 200 and volatile memory 206 could be an external RAM device. Using FLASH and/or EEPROM for non-volatile memory 204 allows a user to tailor or customize the performance, fault handling and communication interfaces of motor 102 in software. Non-volatile memory 204 may also include a separate FLASH or EEPROM memory programmed during the production of motor 102 with data taking into account motor-to-motor variations and special customer requirements.

A/D converter 208 receives analog voltage signals from the over/under voltage circuit, overcurrent circuit, overtemperature circuit (if used) and the speed setpoint interface (if analog) as described above. Digital input/output interface 210 receives position signals of motor rotor 116 from sensing circuit 106 and transmits control signals to the MOSFET drivers of power stage 112.

Motor controller 110 can also include an analog or digital interface, such as an RS-232 serial interface, to communicate with an external device, such as an ECU. Using the interface, motor controller 110 can receive control parameters (e.g., speed setpoint signal 146) from the external device and transmit operating parameters and performance data (e.g., speed or temperature) as well as diagnostic data (e.g., faults) to the external device. The interface can also be used for debugging purposes and for downloading programming information.

In a preferred embodiment, motor controller 110 includes a PWM interface which receives a PWM signal from an ECU. During normal operation, the ECU transmits a 300 Hz PWM signal to motor controller 110 with a duty cycle representative of speed setpoint signal 146. The ECU can also command motor controller 110 to switch to an afterrun mode of operation by switching the PWM signal to a 10 Hz signal with the vehicle stopped. In afterrun operation, motor controller 110 runs motor 102 for a period of time to cool the engine compartment after the vehicle stops, thereby preventing excessive heat build-up. The duty cycle of the PWM signal sets the duration and speed of motor 102.

Referring to FIGS. 3 through 7, exemplary flow chart diagrams show the main procedure performed by motor controller 110 during operation of motor 102. The logic shown assumes that control system 100 includes a sensing circuit 106 which senses the back EMF voltages generated in motor windings 114 to determine the rotary position of rotor 116, and that motor controller 110 receives a PWM command signal from an external device such as an ECU. The flowchart may be changed as appropriate for other embodiments of the invention.

At steps 300 and 302, motor controller 110 performs initialization logic when power is applied to control system 100, such as when vehicle ignition is turned on. At steps 304 and 306, motor controller 110 checks speed setpoint signal 146 and inhibits start-up of motor 102 if the setpoint is not within a predetermined range. In one embodiment, a PWM signal providing the speed setpoint signal has a duty cycle range of between 10% and 90%. At step 308, the system checks battery voltage by digitizing the analog voltage signal sensed by the over/under voltage circuit. An over-voltage condition is detected when sensed voltage exceeds an upper limit and an under-voltage condition is detected when sensed voltage is less than a lower limit. Range limits can be user-specified in software, and are set at approximately 9 and 16 V in a preferred embodiment. The limits are compatible with typical battery voltage of 12 V and an operating range between 8 and 19 V. Start-up is inhibited if the voltage level is unacceptable.

At step 310, motor controller 110 checks the direction of rotation of rotor 116 by examining the rotor position signals from sensing circuit 106. If rotor 116 is stationary or moving in a wrong direction when power is applied, the system brakes motor 102 and moves rotor 116 into a fixed position as shown in steps 314 to 330. In a preferred embodiment, motor controller 110 energizes one winding (e.g., phase A) of motor 102 for a period of time and then energizes two windings (e.g., phases A and B) until rotor 116 comes to rest in the fixed position. Current applied to the windings is adjusted to a setpoint value during the braking sequence at steps 324 through 330. After movement stops, or after phases A and B have been energized for a time period, motor controller 110 executes a start-up sequence at step 332.

Figure 5:
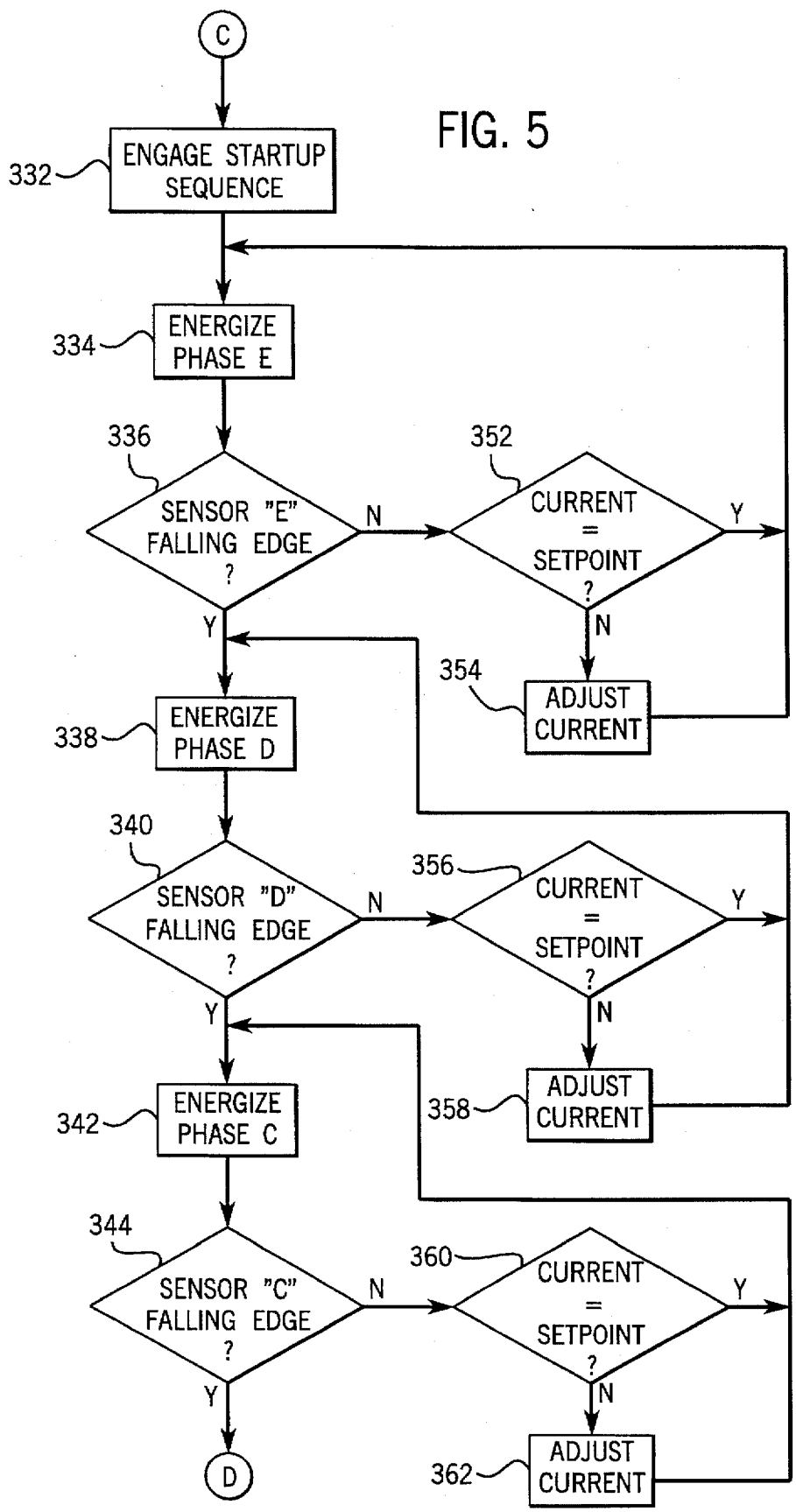
Figure 6:
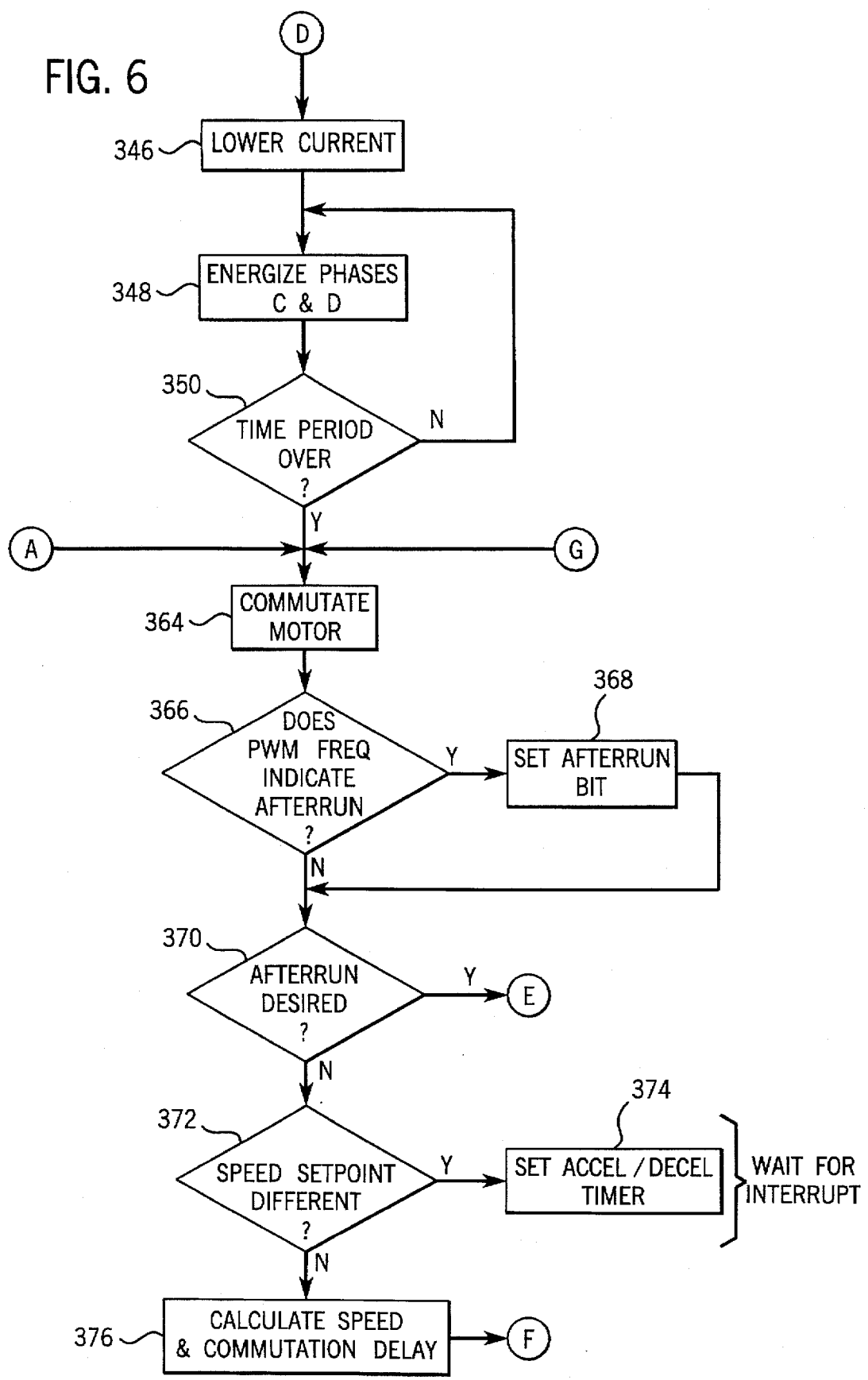

Referring to steps 332 through 362 shown in FIGS. 5 and 6, motor controller 110 sequences windings 114 in an open-loop start-up sequence to cause rotor 116 to rotate in the correct direction and attain a speed sufficient to generate detectable back EMF signals. In one embodiment, the start-up sequence energizes windings 114 in four steps. First, phase E is energized until a falling edge signal is detected by sensor E (FIGS. 12A through 12E show how windings 114 and sensors 106 are labeled). Second, phase D is energized until a falling edge signal is detected by sensor D. Third, phase C is energized until a falling edge signal is detected by sensor C. Fourth, after lowering the current at step 346, phases C and D are energized for a time period. After this point, rotor 116 should be rotating in the correct direction at a speed sufficient for sensing circuit 106 to detect back EMF signals suitable for closed-loop control. As shown in steps 352 through 362, current applied to motor windings 114 is limited in the first three steps of the start-up sequence to a setpoint value to prevent damage to windings 114 and/or power stage 112.

As shown at step 364 in FIG. 6, once rotor 116 is rotating in the correct direction, motor controller 110 commutates motor windings 114 based on the rotary position of the rotor. Motor controller 110 generates the PWM control signals to commutate motor windings 114 based upon a binary pattern received from the position sensors. For more information regarding the commutation algorithm, please refer to the software listing in the microfiche appendix.

In one embodiment, two motor windings 114 are commutated at a time, with both motor windings turned on and off generally together. Energizing multiple windings using multiple switches (e.g., transistors, relays, SCRs, etc.) decreases the flow of current through each switch by providing parallel paths for the total current flow. For example, if two phases are energized, two switches controlling the flow of current through the windings each carries one-half of the total current. Each switch dissipates less power and runs cooler than a system in which only one winding is energized at a time since each switch carries only a fraction of the total current. The reduction in current through each switch, as well as the use of PWM drivers, minimizes or at least reduces the power dissipation of windings 114 and allows motor 102 to operate more reliably in high-temperature environments.

The inductive energy stored in the windings is released when the current to the windings is turned off. Thus, turning two windings on and off simultaneously may result in a large energy discharge during turn off. The energy release during coil turn off can be decreased by using alternate chopping. Alternate chopping distributes the release of energy from the two windings over time and results in a smaller magnitude of energy release, thereby reducing conducted and radiated noise emissions.

Active snubbing, rather than passive snubbing, may be used to conduct energy stored in the windings during the off portion back to the positive rail quickly and efficiently. The use of active snubbing suppresses parasitic oscillations and ringing during turn off, and minimizes the voltage across the conducting MOSFET drains, preventing avalanche breakdown of the device. If the energy stored in the MOSFET's is released to the positive rail quickly, the energy stored in the coils will not heat the snubber circuit, and the temperature rise inside the motor will be decreased.

In addition, a planar snubber circuit may be used rather than a snubber using discrete components. The planar snubber has its resistance and capacitance distributed across the length and width of the circuit, which results in a smaller packaging size, and which is believed to provide lower power dissipation and lower radiated RFI.

At step 366, motor controller 110 determines whether the frequency of the PWM input signal indicates that afterrun mode is commanded. A 300 Hz frequency indicates normal mode and a 10 Hz frequency indicates afterrun mode. If afterrun mode is commanded, a bit is set at step 368 and motor controller 110 jumps to the afterrun logic (described below in relation to FIG. 11) at step 370.

At step 372, motor controller 110 detects whether a change occurred in speed setpoint signal 146. If so, the system sets an accel/decel timer and waits for an interrupt at step 374. If not, the system calculates a speed and commutation delay at step 376.

Figure 7:
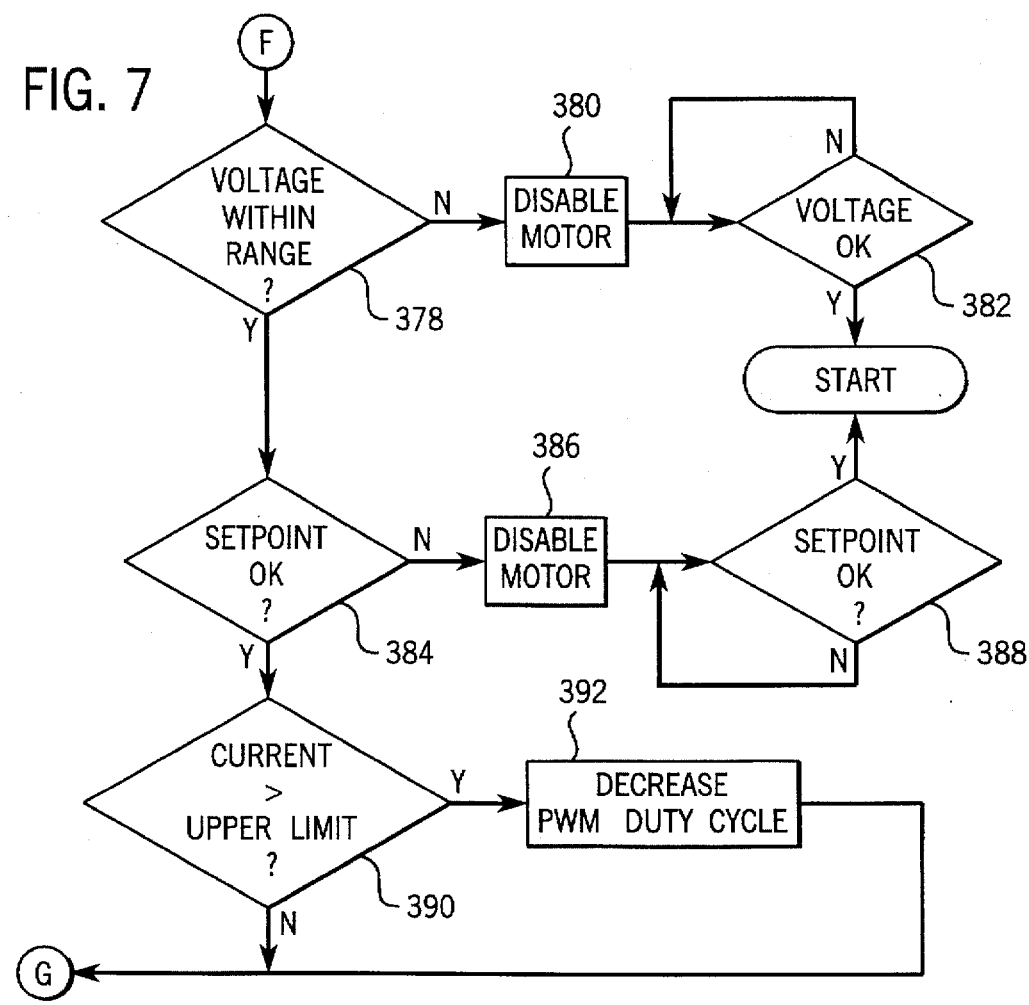

Referring to steps 378 through 388 shown in FIG. 7, motor controller 110 monitors the battery voltage and speed setpoint signal 146. If battery voltage is not within range, or if speed setpoint signal 146 is below a minimum value (e.g., a duty cycle of less than 10%), then motor 102 is disabled by cutting off the control signals to power stage 112. Motor 102 remains disabled and continues to idle until the voltage or speed setpoint fault disappears, at which point the system re-starts.

At step 390, the system detects the current flowing through control system 100 by converting the analog voltage signal generated by the overcurrent circuit as described above. If the current exceeds a threshold limit (e.g., 33 Amps) specified by the user in software, the current applied to motor 102 is limited by decreasing the duty cycle of the PWM control signals at step 392. The current may also be limited based upon a feedback from the over/under voltage circuit. Thus, variations in battery voltage and load are taken into account. For example, the current flowing through motor windings 114 can be limited at higher voltages to ensure that a defrost function is available in the event of a voltage regulator failure. The logic then repeats at step 364.

Motor controller 110 may also be configured to check for an overtemperature condition by converting an analog voltage signal generated by an overtemperature circuit. An overtemperature condition would exist when the sensed temperature exceeds a user-defined threshold temperature. Different threshold temperatures may be specified for different power levels. When an overtemperature condition is detected, the system may limit the pulse width of the control signals such that motor 102 operates at a lower speed. For example, if high ambient temperature results in an overtemperature condition, and motor 102 is rotating an engine cooling fan, motor 102 would not be completely de-energized so as to continue to provide a cooling air flow and prevent overheating of the engine. Desired full motor speed and power would not be restored unless the temperature falls below the threshold.

Figure 8:
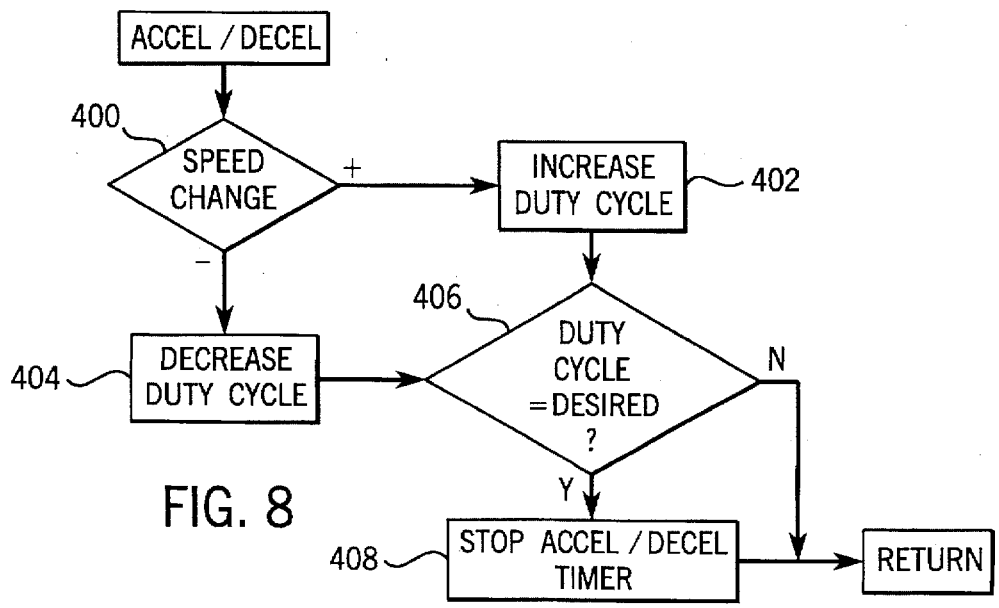
FIG. 8 is an exemplary flow chart diagram showing the acceleration/deceleration timer interrupt routine executed by the motor controller of FIG. 1.

Referring to FIG. 8, motor controller 110 executes an accel/decel timer interrupt routine to change the speed of motor 102 if the accel/decel timer was set at step 374 in response to a change in speed setpoint signal 146 and the change has not yet been achieved. Steps 400 through 406 change the PWM duty cycle at a predetermined rate until the desired duty cycle is achieved. The rates of change of the duty cycle governs the acceleration and deceleration rates of motor 102 and are set in software. Once the change in PWM duty cycle is achieved, the accel/decel timer is stopped at step 408 and the logic returns.

The system may set the speed of motor 102 by comparing the actual speed of rotor 116, determined by measuring the time between successive rotary positions of rotor 116, with a desired speed from setpoint signal 146. The duty cycle of the control signal is varied to provide closed-loop speed control. Various control algorithms may be used to control speed in a closed-loop fashion, such as proportional-integral-derivative (PID) or fuzzy logic. Closed-loop speed control can guarantee motor performance under various conditions such as varying battery voltage.

Figure 9:
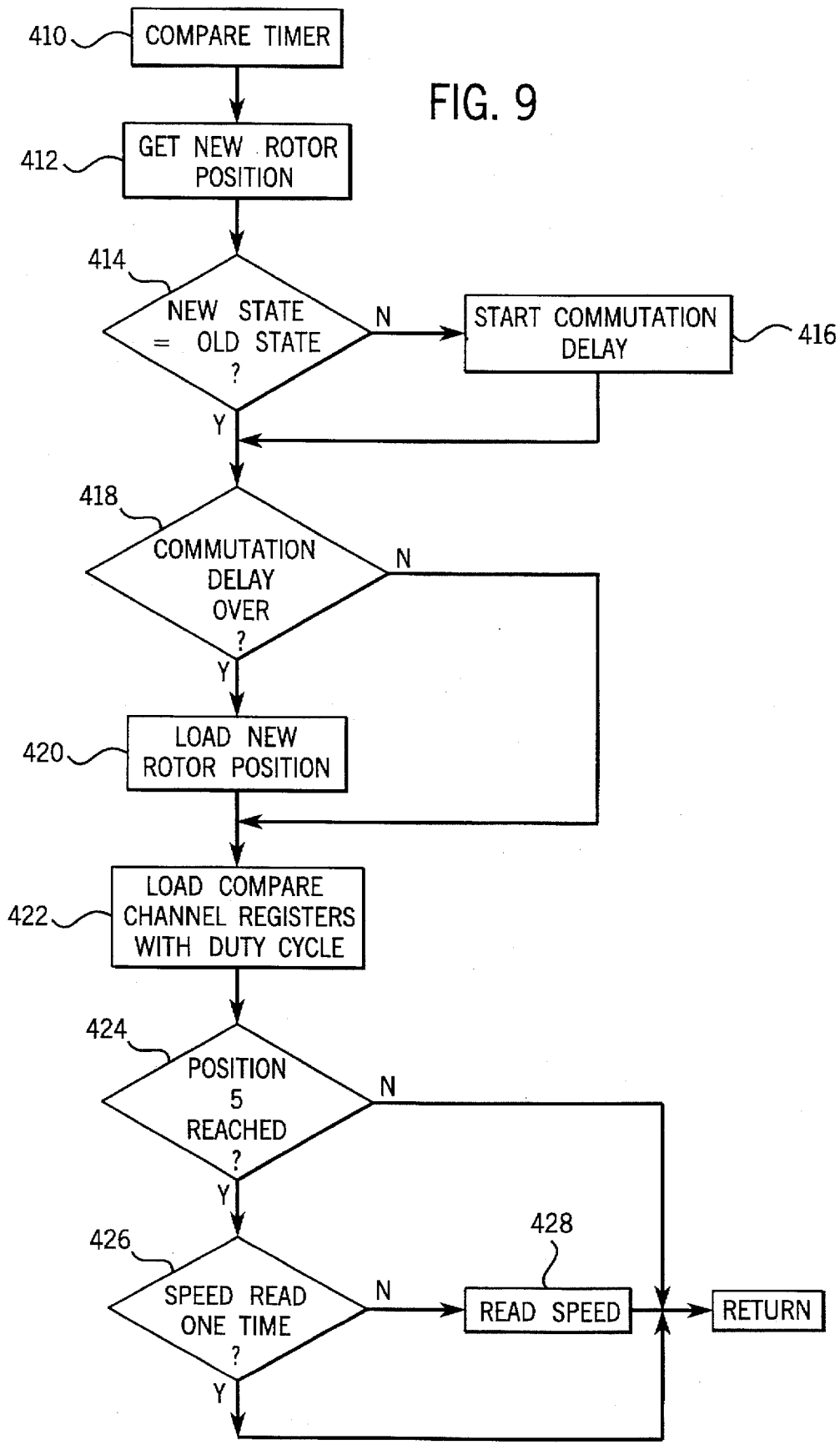
FIG. 9 is an exemplary flow chart diagram showing the compare timer interrupt routine executed by the motor controller of FIG. 1.

Referring to FIG. 9, motor controller 110 executes a compare timer interrupt routine at step 410. At step 412, the new rotor position is read. At steps 414 and 416, a commutation delay is started if the new state is not equal to the old state. At steps 418 and 420, motor controller 110 loads the new rotor position once the commutation delay is over. At step 422, the compare channel registers are loaded with duty cycle information. At steps 424 through 428, the speed is read if a certain position has been reached (e.g., position 5) and the speed has not already been read once. Further details are available in the program listing.

Figure 10:
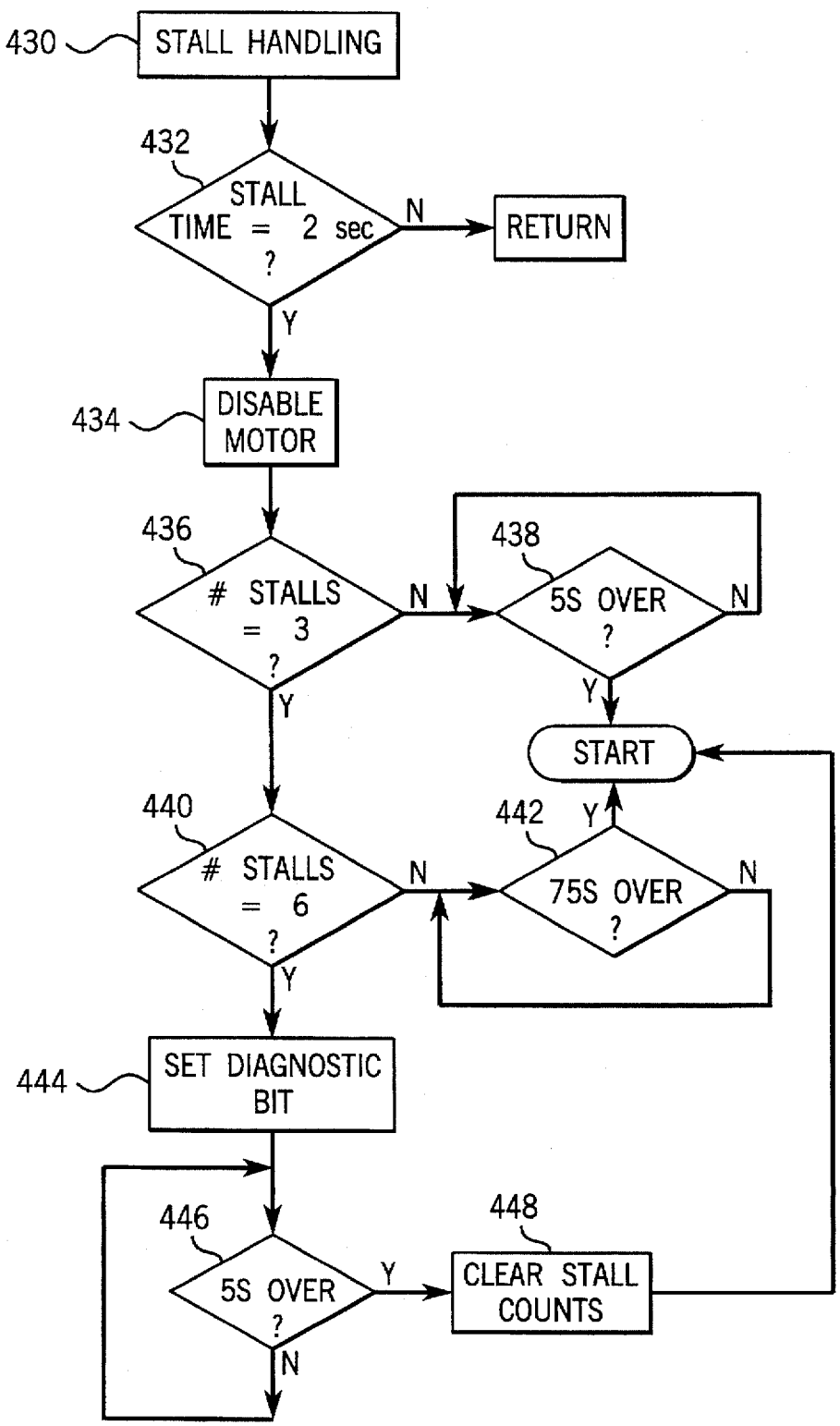
FIG. 10 is an exemplary flow chart diagram showing the stall handling routine executed by the motor controller of FIG. 1.

Referring to FIG. 10, the system checks for a stall or reduced speed condition at step 430. In one embodiment, motor controller 110 starts a timer or integrator each time a different rotor position is detected. A stall/reduced speed fault is detected if the rotor position stays the same for a time greater than the time required to change position at the lowest possible operating speed (e.g., 32 rpm) under normal operating conditions. Alternatively, motor controller 110 may start a timer or integrator once per revolution of rotor 116. If rotor 116 reaches the same position within a specified time, the timer or integrator is reset. However, if the timer times out or the integrator output signal reaches a threshold level, a fault is detected. Motor controller 110 may also detect a stall/reduced speed condition by determining the speed of rotor 116 based upon a time derivative of rotor position, and comparing the speed to a user-specified stall/reduced speed value. In another alternative, the system may detect a stall based upon an excessive level of sensed current. However, current sensing may be undesirable since excessive stall currents may not occur if motor 102 stalls at very low speeds.

At step 434, power to motor 102 is cut if a stall or reduced speed condition is detected in order to protect motor 102 and power stage 112 when rotation of rotor 116 is obstructed. As shown at steps 436 through 442, motor controller 110 attempts to restart motor 102 after a stall is detected. The system waits a predetermined amount of time between restarting attempts depending on the number of stalls detected. As shown at steps 444 through 448, once a predetermined number of stalls has been detected, the system sets a diagnostic error bit, delays for a time period, clears the stall counter and restarts motor 102. Alternatively, upon detecting a stall condition, motor controller 110 may disable motor 102 and wait for power to be cycled (e.g., by turning the ignition off and then on again) to re-start the system.

Figure 11:
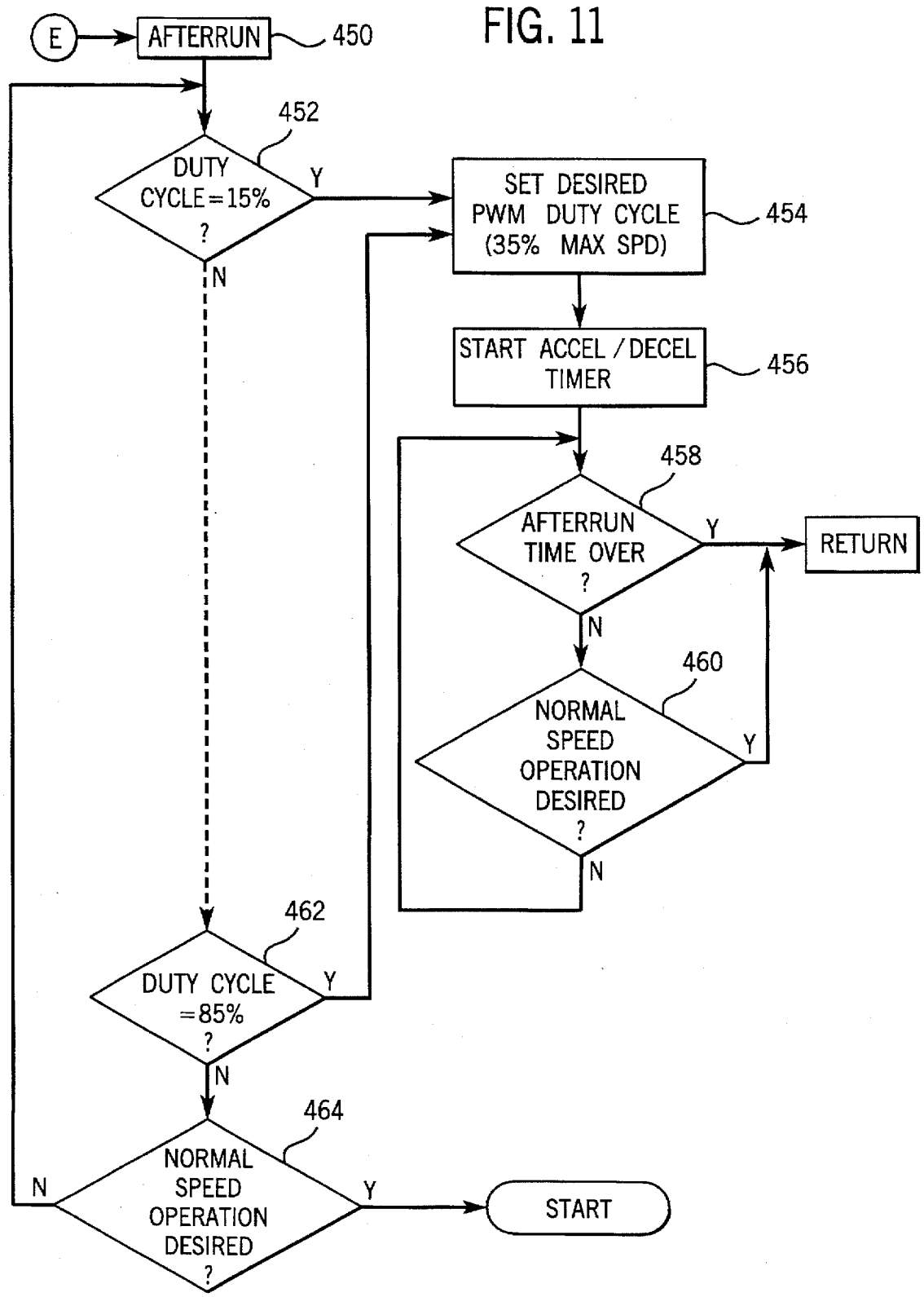
FIG. 11 is an exemplary flow chart diagram showing the afterrun routine executed by the motor controller of FIG. 1.

Referring to FIG. 11, motor controller 110 executes an afterrun mode upon receiving an afterrun command. At step 452, motor controller 110 determines the duty cycle of the PWM command input. If the duty cycle is 15%, the system sets the desired PWM duty cycle (limited to a 35% maximum) of the control signals for motor 102 at step 454, starts an accel/decel timer at step 456, and operates motor 102 at the desired speed until the afterrun time is over or normal speed operation is desired as shown at steps 458 and 460. Steps 452 through 460 are repeated for various duty cycle values.

Referring to FIGS. 12A through 12E, a circuit schematic shows an exemplary implementation of control system 100 used to control a five-phase brushless DC motor. The integrated circuits include a TLE4262G voltage regulator (U1), MC4423 MOSFET drivers (U2–U4), an LM2904 amplifier (U5), an 80517 microcontroller (U6) including internal memory, LM2901 comparators (U9 and U10), 74HC193 counters (U11–U14), and an MC3456 dual timer (U15). Labels U7 and U8 are unused. The reverse voltage protection and phase driver MOSFETs are BUZ342s (Q1–Q7). The components are connected as shown in FIGS. 12A through 12E.

Alternatively, tasks performed by various components of the schematic shown in FIGS. 12A through 12E may be performed by a single integrated circuit. For example, the tasks of microprocessor U6, counters U11 to U14 and dual timer U15 may be combined in one integrated circuit, thereby increasing reliability and reducing cost.

While the embodiments illustrated in the FIGURES and described above are presently preferred, it should be understood that these embodiments are offered by way of example only. For example, the fault handling sequences described above may perform other tasks based upon user requirements. As another example, while the description above makes reference to a brushless DC motor used to drive a vehicle engine cooling fan, the motor can be used in other applications such as in HVAC equipment. The invention is not intended to be limited to any particular embodiment, but is intended to extend to various modifications that nevertheless fall within the scope of the appended claims.

What is claimed is:

1. A control system for electronically commutating a five-phase brushless DC motor adapted to be energized from a source of voltage, the motor including a stator having five windings adapted to be electronically commutated and a rotor mounted for rotation relative to the windings, the control system comprising:

a sensing circuit configured to generate signals corresponding to a rotary position of the rotor, said sensing circuit adapted to sense the rotary position by comparing back electromotive force voltages in the windings to each other;

an electronic commutation circuit including switches coupled to the windings; and a control circuit coupled to the sensing circuit and the commutation circuit, the control circuit configured to generate control signals in response to the rotary position of the rotor and to apply the control signals to the commutation circuit, wherein the commutation circuit controls current flow through the windings in response to the control signals.

2. The control system of claim 1 wherein the sensing circuit includes five comparators for comparing the back electromotive force voltages in five pairs of windings.

3. The control system of claim 1 wherein the sensing circuit senses the rotary position of the rotor based upon signals from at least one sensor.

4. The control system of claim 3 wherein the at least one sensor is an optical sensor coupled to a motor shaft.

5. The control system of claim 3 wherein the at least one sensor is a magnetic sensor.

6. The control system of claim 1 wherein the control circuit, upon start-up, determines a direction of rotation of the rotor and, if the rotor is rotating in a wrong direction, energizes preselected windings and waits for movement of the rotor to come substantially to a stop and then energizes the windings in a start-up sequence to cause the rotor to rotate in a correct direction and, when the rotor is rotating in the correct direction, electronically commutates the windings in response to the rotary position of the rotor.

7. The control system of claim 6 wherein the flow of current through the windings is limited during start-up of the motor.

8. The control system of claim 1 wherein the sensing circuit generates a pattern of signals related to the rotary position of the rotor, and the control circuit commutates the windings based upon the pattern of signals received from the sensing circuit.

9. The control system of claim 1 further comprising speed reference input signal, wherein the control circuit modifies the control signals based upon a comparison between the speed reference input signal and a speed of the rotor determined from a time derivative of rotor position.

10. The control system of claim 9 wherein the control signals are pulse-width-modulated signals, and the speed of the rotor is modified by changing a duty cycle of the control signals.

11. The control system of claim 1 wherein the control circuit includes a programmable controller.

12. A drive circuit for a five-phase brushless DC motor having five windings and a rotor mounted for rotation relative to the windings, the windings adapted to be energized by a timed application of drive voltages producing a flow of phase currents in the respective windings, the drive circuit comprising:

at least five sensors including a plurality of position sensors configured to generate a pattern of signals related to a rotary position of the rotor;

electrically controllable switches coupled to the windings; and a motor controller coupled to the position sensors and the controllable switches, the motor controller configured to generate commutation control signals based upon the pattern of signals received from the position sensors and to apply the control signals to the controllable switches, wherein the controllable switches control the flow of current through the windings in response to the control signals.

13. The drive circuit of claim 12 wherein the timed application of voltages produce back electromotive force voltages in the windings, and the position sensors sense the back electromotive force voltages.

14. The drive circuit of claim 12 further comprising a speed reference input signal, wherein the motor controller modifies the control signals based upon a comparison between the speed reference input signal and a speed of the rotor determined from a time derivative of rotor position.

15. A control system for a brushless DC motor adapted to be energized from a source of voltage, the motor including a stator having a plurality of windings adapted to be electronically commutated and a rotor mounted for rotation relative to the windings, the control system comprising:

- a sensing circuit configured to generate signals corresponding to a rotary position of the rotor;
- an electronic commutation circuit including switches coupled to the windings; and
- a control circuit coupled to the sensing circuit and the commutation circuit, the control circuit configured to limit the flow of current through the windings during start-up and determine a direction of rotation of the rotor upon start-up and, if the rotor is rotating in a wrong direction, to energize at least two windings and wait for movement of the rotor to come substantially to a stop and then energize the plurality of windings in a start-up sequence to cause the rotor to rotate in a correct direction and, when the rotor is rotating in the correct direction, to electronically commutate the windings in response to the rotary position of the rotor.

16. The control system of claim 15 wherein the motor as five windings.

17. The control system of claim 15 wherein the control signals are pulse-width modulated.

18. The control system of claim 15 wherein the control circuit comprises a programmable controller.

19. A control system for electronically commutating a brushless DC motor adapted to be energized from a source of voltage, the motor including a stator having a plurality of windings adapted to be commutated and a rotor mounted for rotation relative to the windings, the control system comprising:

- a sensing circuit configured to generate signals corresponding to the rotary position of the rotor;
- an electronic commutation circuit including switches coupled to the windings;
- a control circuit coupled to the sensing circuit and the commutation circuit, the control circuit configured to generate pulse-width modulated control signals in response to the rotary position of the rotor and to apply the control signals to the commutation circuit, wherein the commutation circuit responds to the control signals by energizing at least two windings at generally a same time and
- at least two switches through which flow of current through the energized windings is split therebetween.

20. The control system of claim 19 wherein the at least two windings energized at generally the same time are de-energized over a period of time.

* * * * *